US010219284B2

(12) United States Patent
Farhadi

(10) Patent No.: US 10,219,284 B2
(45) Date of Patent: Feb. 26, 2019

(54) MULTI-BAND RESOURCE SCHEDULING FOR WIRELESS DEVICE TETHERING

(71) Applicant: FUJITSU CONNECTED TECHNOLOGIES LIMITED, Kawasaki-shi, Kanagawa (JP)

(72) Inventor: Golnaz Farhadi, Sunnyvale, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 134 days.

(21) Appl. No.: 14/231,332

(22) Filed: Mar. 31, 2014

(65) Prior Publication Data
US 2015/0282195 A1    Oct. 1, 2015

(51) Int. Cl.
*H04W 72/08* (2009.01)
*H04W 52/14* (2009.01)
(Continued)

(52) U.S. Cl.
CPC ..... *H04W 72/085* (2013.01); *H04W 28/0252* (2013.01); *H04W 52/143* (2013.01);
(Continued)

(58) Field of Classification Search
CPC ............. H04W 72/085; H04W 52/143; H04W 52/386; H04W 52/346; H04W 52/146;
(Continued)

(56) References Cited

U.S. PATENT DOCUMENTS 8,982,722 B1 *   3/2015   Park ................. H04L 1/0003
                                                    370/252
9,113,344 B1 *   8/2015   Lee .................... H04W 24/00
(Continued)

OTHER PUBLICATIONS

Jim Martin, Rahul Amin, Ahmed Eltawil, Amr Hussien, Using Reconfigurable Devices to Maximize Spectral Efficiency in Future Heterogeneous Wireless Systems, 2011 IEEE, 978-1-4577-0638-7 /11, 1-8.*
(Continued)

*Primary Examiner* — Noel R Beharry
*Assistant Examiner* — Wilfred Thomas
(74) *Attorney, Agent, or Firm* — Maschoff Brennan

(57) ABSTRACT

A method of scheduling wireless communications may include assigning a first band of a wireless communications standard for wireless communications between a wireless communications supervisor of a wireless network and one or more wireless devices. The one or more wireless devices may include one or more hotspot devices. The method may also include assigning a second band of the wireless communications standard for wireless communications between the one or more hotspot devices and one or more slave wireless devices. The one or more hotspot devices may be configured to relay information between the one or more slave wireless devices and the wireless communications supervisor. The method may also include determining a power adjustment for communications by the one or more hotspot devices. The power adjustment may be determined based on a congestion of one or more channels within one or more of the first band and the second band.

14 Claims, 8 Drawing Sheets

(51) Int. Cl.
*H04W 52/38* (2009.01)
*H04W 52/34* (2009.01)
*H04W 52/26* (2009.01)
*H04W 72/04* (2009.01)
*H04W 52/24* (2009.01)
*H04W 28/02* (2009.01)
*H04W 84/12* (2009.01)
*H04W 88/04* (2009.01)

(52) U.S. Cl.
CPC ....... *H04W 52/146* (2013.01); *H04W 52/241* (2013.01); *H04W 52/262* (2013.01); *H04W 52/343* (2013.01); *H04W 52/346* (2013.01); *H04W 52/386* (2013.01); *H04W 72/0453* (2013.01); *H04W 84/12* (2013.01); *H04W 88/04* (2013.01)

(58) Field of Classification Search
CPC ........... H04W 52/262; H04W 72/0453; H04W 52/241; H04W 28/0252; H04W 52/343; H04W 84/12; H04W 88/04
See application file for complete search history.

(56) References Cited

U.S. PATENT DOCUMENTS

| | | | | |
|---|---|---|---|---|
| 2004/0165612 A1* | 8/2004 | Backes | ................ | H04L 47/125 370/431 |
| 2006/0142040 A1* | 6/2006 | Jones | ................... | H04W 52/34 455/522 |
| 2007/0104128 A1* | 5/2007 | Laroia | ................... | H04W 36/18 370/329 |
| 2007/0223403 A1* | 9/2007 | Furuskar | .............. | H04W 52/24 370/278 |
| 2007/0281711 A1* | 12/2007 | Matta | ...................... | H04L 47/10 455/453 |
| 2007/0298810 A1* | 12/2007 | Kasher | ................. | H04W 16/14 455/452.1 |
| 2008/0061993 A1* | 3/2008 | Fong | ...................... | G08B 21/22 340/573.4 |
| 2008/0117864 A1* | 5/2008 | Wu | ........................ | H04W 84/20 370/329 |
| 2008/0186900 A1* | 8/2008 | Chang | ............... | H04W 72/1263 370/315 |
| 2009/0060009 A1* | 3/2009 | Qian | ................... | H04L 49/9094 375/211 |
| 2011/0149768 A1* | 6/2011 | Kang | ................. | H04W 72/082 370/252 |
| 2011/0153805 A1* | 6/2011 | Beninghaus | ......... | H04B 17/309 709/224 |
| 2012/0230304 A1* | 9/2012 | Barbu | ................... | H04W 48/18 370/338 |
| 2013/0044674 A1* | 2/2013 | Teyeb | ................ | H04B 7/15542 370/315 |
| 2013/0337821 A1* | 12/2013 | Clegg | ................... | H04L 5/0062 455/452.1 |
| 2014/0206346 A1* | 7/2014 | Kiukkonen | ....... | H04W 52/0229 455/426.1 |
| 2016/0337177 A1* | 11/2016 | Lindoff | ................. | H04W 16/14 |

OTHER PUBLICATIONS

M. Heusse, F. Rousseau, R. Guillier, and A. Duda, "Performance anomaly of 802.11b" Proc. of IEEE INFOCOM'03, 2003.

P. Bahl, R. Chandra, P. Lee, V. Misra, J. Padhye, D. Rubenstein, and Y. Yu, "Opportunistic use of client repeaters to improve performance of wlans," Networking, IEEE/ACM Transactions on, vol. 17, No. 4, pp. 1160-1171, 2009.

K. Tan, J. Fang, Y. Zhang, S. Chen, L. Shi, J. Zhang, and Y. Zhang, "Fine-grained Channel Access in Wireless LAN," in ACM SIGCOMM, 2010.

G. Tan and J. Guttag, "Time-based fairness improves performance in multi-rate WLANs," 2004.

M. Heusse, F. Rousseau, R. Guillier, and A. Duda, "Idle sense: an optimal access method for high throughput and fairness in rate diverse wireless LANs," SIGCOMM, vol. 35, No. 4, pp. 121-132, 2005.

S. hwan Yoo, J. Choi, J. Hwang, and C. Yoo, "Eliminating the performance anomaly of 802.11b," in Networking—ICN, 2005, pp. 1055-1062.

L. Guo, X. Ding, H.Wang, Q. Li, S. Chen, and X. Zhang, "Cooperative relay service in a wireless LAN," IEE J. Sel. Areas Commun., vol. 25, No. 2, pp. 355-368, Feb. 2007.

B. Zhang, Z. Zheng, X. Jia, and K. Yang, "A distributed collaborative relay protocol for multi-hop wlan accesses," in GLOBECOM 2010, IEEE, 2010, pp. 1-5.

S. Narayanan and S. S. Panwar, "To forward or not to forward—that is the question," Wireless Personal Commun., vol. 43, No. 1, pp. 65-87, Oct. 2007.

Stanford OpenRoads Deployment: http://yuba.stanford.edu/~peyman/docs/openroads.pdf, Sep. 2009.

Office Action dated Oct. 30, 2018 issued in the corresponding Japanese application No. 2015-015590 Full Translation of the Office Action.

* cited by examiner

MULTI-BAND RESOURCE SCHEDULING FOR WIRELESS DEVICE TETHERING

FIELD

The present disclosure relates to multi-band resource scheduling for wireless device tethering.

BACKGROUND

Many electronic devices, such as tablets, laptop computers, televisions, gaming systems, Blu-ray players, and other electronic devices (referred to generally as "wireless devices"), use wireless networks to connect with each other and other networks, such as the Internet. In some instances, a data rate associated with a wireless device communicating over a wireless network may be based on a wireless communications link ("link") between the wireless device and an access point of the wireless network. For example, the data rate experienced by the wireless device may be fairly high when the signal-to-noise ratio (SNR) of the link between the wireless device and the access point is fairly high. Conversely, the data rate experienced by the wireless device may be fairly low when the SNR of the link between the wireless device and the access point is fairly low.

In some instances, multiple wireless devices may be connected to the same access point where the link quality of some links between some wireless devices and the access point may be better (e.g., higher SNR) than that of other links between other wireless devices and the access point. Further, due to some protocols and standards that may be used by the wireless network (e.g., the Institute of Electrical and Electronics Engineers (IEEE) 802.11 wireless communications standard (also referred to as "WiFi")), when wireless devices having different link qualities are connected to the same access point, a rate anomaly problem may occur. The rate anomaly problem may result in the wireless devices with poor link quality causing the data rates experienced by wireless devices with good link quality to be as if the link quality was poor.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of scheduling wireless communications may include assigning a first band of a wireless communications standard for wireless communications between a wireless communications supervisor of a wireless network and one or more wireless devices. The one or more wireless devices may include one or more hotspot devices. The method may also include assigning a second band of the wireless communications standard for wireless communications between the one or more hotspot devices and one or more slave wireless devices. The one or more hotspot devices may be configured to relay information between the one or more slave wireless devices and the wireless communications supervisor. The method may also include determining a power adjustment for communications by the one or more hotspot devices. The power adjustment may be determined based on a congestion of one or more channels within one or more of the first band and the second band.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
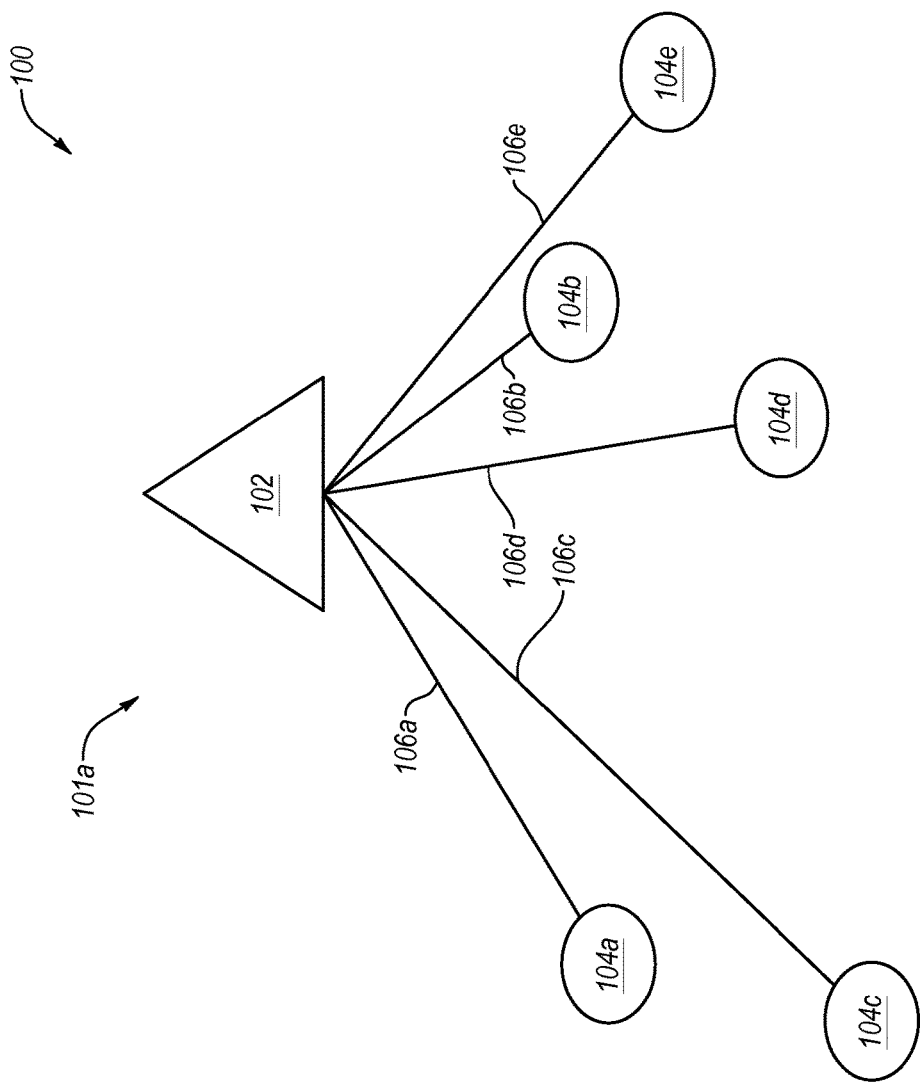
FIG. 1A illustrates a pre-tethering configuration of an example wireless communication network.

Wireless communications are performed by transmitting wireless signals at certain frequencies within the electromagnetic spectrum. Frequency ranges (referred to as "bands") within the electromagnetic spectrum have been designated for certain types of wireless communications to avoid interference of different types of wireless communications. For example, the Institute of Electrical and Electronics Engineers (IEEE) 802.11 wireless communications standard (also referred to as "WiFi") may use frequencies within a 2.4 GHz band, a 3.6 GHz band, a 4.9 GHz band, a 5 GHz band, a 5.9 GHz band, a 60 GHz band, and/or one or more white space bands (e.g., bands now available due to digital television transmissions). Additionally, each band may be divided into smaller frequency ranges (referred to as "channels") such that different wireless communications of the same type may not interfere with each other.

Some wireless communications standards (e.g., WiFi) are configured such that a wireless communications supervisor (e.g., an access point) of a wireless network communicates with wireless devices using the same channel or channels within the same band. In these instances, the communications between the wireless devices and the wireless communications supervisor may be performed at different times to avoid interference. Additionally, when a wireless device communicates with the wireless communications supervisor over a relatively weak wireless communications link (referred to hereinafter as a "link"), for example a link with a low signal-to-noise ratio (SNR), the wireless device may use a disproportionate amount of time to communicate with the wireless communications supervisor. The disproportionate amount of time used by the wireless device with the relatively weak link may not allow a wireless device with a stronger link with the wireless communications supervisor as much time to transmit data. As a result of reduced time to transmit data, the overall throughput of data of the wireless device with the stronger link may be reduced. This phenomenon is often referred to as a "rate-anomaly" problem.

According to at least one embodiment described herein, to help reduce instances of the rate-anomaly problem, one or more wireless devices operating on a wireless network may be designated and configured as hotspot wireless devices. The one or more wireless devices may be designated and configured as hotspot wireless devices based on a link indicator (e.g., signal-to-noise ratio (SNR)) of each of the wireless communication links between the one or more wireless devices and the wireless communications supervisor. The wireless communications links between a wireless communications supervisor and a hotspot device may be referred to as a "hotspot link." The link indicators of the hotspot links may indicate a strong link and may also be within a threshold value of each other. With the link indicators for each of the hotspot links being within the threshold value, the rate-anomaly problem with respect to the hotspot wireless devices and the wireless communications supervisor may be avoided and/or reduced because each respective hotspot link may have approximately the same throughput or data rate ability. Furthermore, a channel of a first band of a wireless communications standard (e.g., a first WiFi band such as 2.4 GHz) may be assigned for wireless communications between the hotspot wireless devices and a wireless communications supervisor in the wireless network.

The hotspot wireless devices may be configured to relay information between the wireless communications supervisor and one or more other wireless devices in the wireless network that may each act as a slave wireless device with respect to one of the hotspot wireless devices. In some embodiments, each hotspot wireless device may be configured to transmit the same beacon signal (e.g., a service set identification (SSID)) as the wireless communications supervisor such that the slave wireless devices of a particular hotspot wireless device may associate with and be wirelessly tethered to the particular hotspot wireless device.

Additionally, the links between a particular hotspot wireless device and its respective slave wireless devices may be stronger than the links between the respective slave wireless devices and the wireless communications supervisor such that the slave wireless devices may connect with the particular hotspot wireless device. As a result, the wireless devices that may have previously caused the rate anomaly problem with the wireless communications supervisor because of weak links between the wireless communications supervisor and the wireless devices may instead act as slave wireless devices with a hotspot wireless device with which a stronger link may be present.

Further, a channel of a band of the wireless communications standard other than the first band (e.g., a second WiFi band such as 5 GHz) may be assigned for communications between each of the hotspot wireless devices and their respective slave wireless devices. The use of different bands for communications between the hotspot wireless devices and the wireless network supervisor and for communications between the hotspot wireless devices and their respective slave wireless devices may make better use of the available spectrum for wireless communications and may reduce interference of communications. Additionally, the use of different bands for communications between the hotspot wireless devices and the wireless network supervisor and for communications between the hotspot wireless devices and their respective slave wireless devices may also reduce or avoid the rate-anomaly problem because the rate-anomaly problem is typically related to communications that occur in the same channel.

Embodiments of the present disclosure will be explained with reference to the accompanying drawings.

FIG. 1A illustrates a pre-tethering configuration 101a of an example wireless communication network 100 (referred to hereinafter as "network 100") configured to perform tethering of one or more wireless devices 104 to reduce the rate-anomaly problem, in accordance with some embodiments of the present disclosure.

The network 100 may be configured to provide wireless communication services to the one or more wireless devices 104 via one or more access points 102. The wireless communication services may be voice services, data services, messaging services, and/or any suitable combination thereof. In the illustrated embodiment, the network 100 may be a WiFi network that complies with the IEEE 802.11 standard. However, the principles taught herein may be used in any applicable wireless network where tethering may be available and/or where the rate-anomaly problem may occur. For example, one or more of the principles described herein may be applied to address the rate-anomaly problem in long-term evolution (LTE) wireless networks.

The access point 102 may be any suitable wireless communication network communication point that may coordinate communications between the wireless devices 104 and/or communications between the wireless devices 104 and a wired network via a wireless (e.g., WiFi) connection. By way of example but not limitation, a wireless router may act as the access point 102. Further, the access point 102 may have multi-band capability in which the access point 102 may be able to communicate over more than one frequency band of a wireless communications standard. For example, the access point 102 may include two or more wireless radios where each of the wireless radios is configured to operate in at least one WiFi band.

The wireless devices 104 may include any device that may use the network 100 for obtaining wireless communications services and may include, by way of example and not limitation, a cellular phone, a smartphone, a personal data assistant (PDA), a laptop computer, a personal computer, a tablet computer, a gaming device, a smart television, a video disc player (e.g., a Blu-ray player) or any other similar device. Additionally, one or more of the wireless devices 104 may have multi-band capability in which one or more of the wireless devices 104 may be able to communicate over more than one frequency band of a wireless communications standard. For example, similar to the access point 102, one or more of the wireless devices 104 may include two or more wireless radios where each of the wireless radios is configured to operate in at least one WiFi band In the pre-tethering configuration 101a, the wireless devices 104 may be wirelessly connected to the access point 102 via links 106. For example, a wireless device 104a may be wireless connected to the access point 102 via a link 106a; a wireless device 104b may be wireless connected to the access point 102 via a link 106b; a wireless device 104c may be wireless connected to the access point 102 via a link 106c; a wireless device 104d may be wireless connected to the access point 102 via a link 106d; and a wireless device 104e may be wireless connected to the access point 102 via a link 106e.

The access point 102 may be configured to obtain one or more link indicators for each of the links 106. The link indicators may indicate the strength or quality of each of the links 106. For example, the link indicator may indicate the gain of the links 106, the received power over each of the links 106, and/or the SNR of each of the links 106. The access point 102 may obtain the link indicators by making its own determinations and/or by receiving information from the wireless devices 104. The access point 102 may obtain the link indicators using any suitable protocol that may determine link quality.

In some embodiments, the access point 102 may be configured to act as a wireless communications supervisor (referred to hereinafter as a "supervisor") that may select one or more of the wireless devices 104 as hotspot wireless devices (referred to hereinafter as "hotspot devices"). The hotspot devices may be wirelessly tethered to one or more other wireless devices 104 that may act as slave wireless devices (referred to hereinafter as "slave devices") of their respective hotspot device. The hotspot devices may be wirelessly tethered to their respective slave devices in that the hotspot devices may be configured to relay information between the access point 102 and their respective slave devices. As indicated above and detailed further below, assigning the wireless devices 104 as hotspot devices and slave devices may improve the throughput of wireless communications between the wireless devices 104 and the access point 102 by reducing and/or eliminating the rate-anomaly problem.

In some embodiments, the access point 102 may select the hotspot devices based on one or more link indicators of each of the links 106. The wireless devices 104 with one or more link indicators indicating strong associated links 106 may be selected as the hotspot devices. Additionally, the hotspot devices may be selected from the link indicators based on one or more of the link indicators of the associated links 106 having relatively similar values such that the links 106 associated with the hotspot devices may have substantially the same throughput. In some embodiments, the hotspot devices may be selected based on the link indicator corresponding to the best link 106 of the hotspot devices and the link indicator corresponding to the worst link 106 of the hotspot devices being within a threshold value of each other.

For example, in some embodiments, the access point 102 (acting as the wireless communications supervisor) may be configured to obtain the SNR for each of the links 106. The access point 102 may then sort the SNRs to determine which of the links 106 have the highest SNR. The access point 102 may then select from the highest SNRs, those that are within a threshold of each other. For example, for a threshold SNR "$\gamma_{thr}$", and a highest SNR "$\gamma_1$," the access point 102 may select the first "K" SNRs "$\gamma_K$" from the sorted SNRs where "$\gamma_1 - \gamma_K \leq \gamma_{thr}$." Accordingly, the wireless devices 104 associated with the links 106 corresponding to the SNRs $\gamma_1$ through $\gamma_K$ may be selected as hotspot devices.

As another example, instead of sorting the SNRs, the access point 102 may determine which SNR is the highest and may determine which of the other SNRs for each of the other links is within the threshold SNR of the highest SNR. The wireless devices 104 associated with the links 106 having the highest SNRs that are within the threshold SNR of the highest SNR may be selected as hotspot devices. For example, for the threshold SNR "$\gamma_{thr}$", and the highest SNR "$\gamma_1$," the access point 102 may select each SNR "$\gamma_i$" from the SNRs where "$\gamma_1 - \gamma_i \leq \gamma_{thr}$." Accordingly, the wireless devices 104 associated with the links 106 corresponding to the SNRs $\gamma_1$ and $\gamma_i$ where "$\gamma_1 - \gamma_i \leq \gamma_{thr}$" may be selected as hotspot devices.

In some embodiments, different modulation and coding schemes (MCSs) used for wireless communications in the network 100 may be chosen for different link qualities such that different MCSs may map to different data rates. An MCS associated with a certain data rate may be referred to as an MCS level such that different MCSs that map to different data rates may be referred to as MCS levels. In these and other embodiments, the threshold value of the link indicator may be selected such that the related link indicators for the hotspot devices map to at most two different MCS levels to reduce the effects of the rate-anomaly problem with respect to the hotspot devices.

Further, as indicated above and detailed below, a band that may be used for wireless communications between the access point 102 and the hotspot devices may be different than the band used for wireless communications between the hotspot devices and their respective slave devices. Accordingly, the hotspot devices may also be selected based on the hotspot devices having a multi-band capability to communicate and operate within more than one band.

In the illustrated embodiment, the links 106a and 106b may be the strongest of the links 106 and may also have one or more link indicators within a threshold value of each other. Additionally, the wireless devices 104a and 104b may be capable of operating in more than one band. Therefore, the access point 102 may select the wireless devices 104a and 104b as hotspot devices. The wireless devices 104a and 104b may also be referred to herein as hotspot devices 104a and 104b when acting as hotspot devices.

The hotspot devices 104a and 104b may be configured to broadcast the same beacon signal (e.g., SSID) as the access point 102. The other wireless devices 104 may be configured to wirelessly connect and associate with the device (e.g., the access point 102, the hotspot device 104a, or the hotspot device 104b) from which they receive the strongest beacon signal. Therefore, the wireless devices 104 that receive the strongest beacon signal from the hotspot device 104a may wirelessly connect and associate with the hotspot device 104a such that they may be wirelessly tethered to the hotspot device 104a as slave devices of the hotspot device 104a. Similarly, the wireless devices 104 that receive the strongest beacon signal from the hotspot device 104b may wirelessly connect and associate with the hotspot device 104b such that they may be wirelessly tethered to the hotspot device 104b as slave devices of the hotspot device 104b.

Figure 1B:
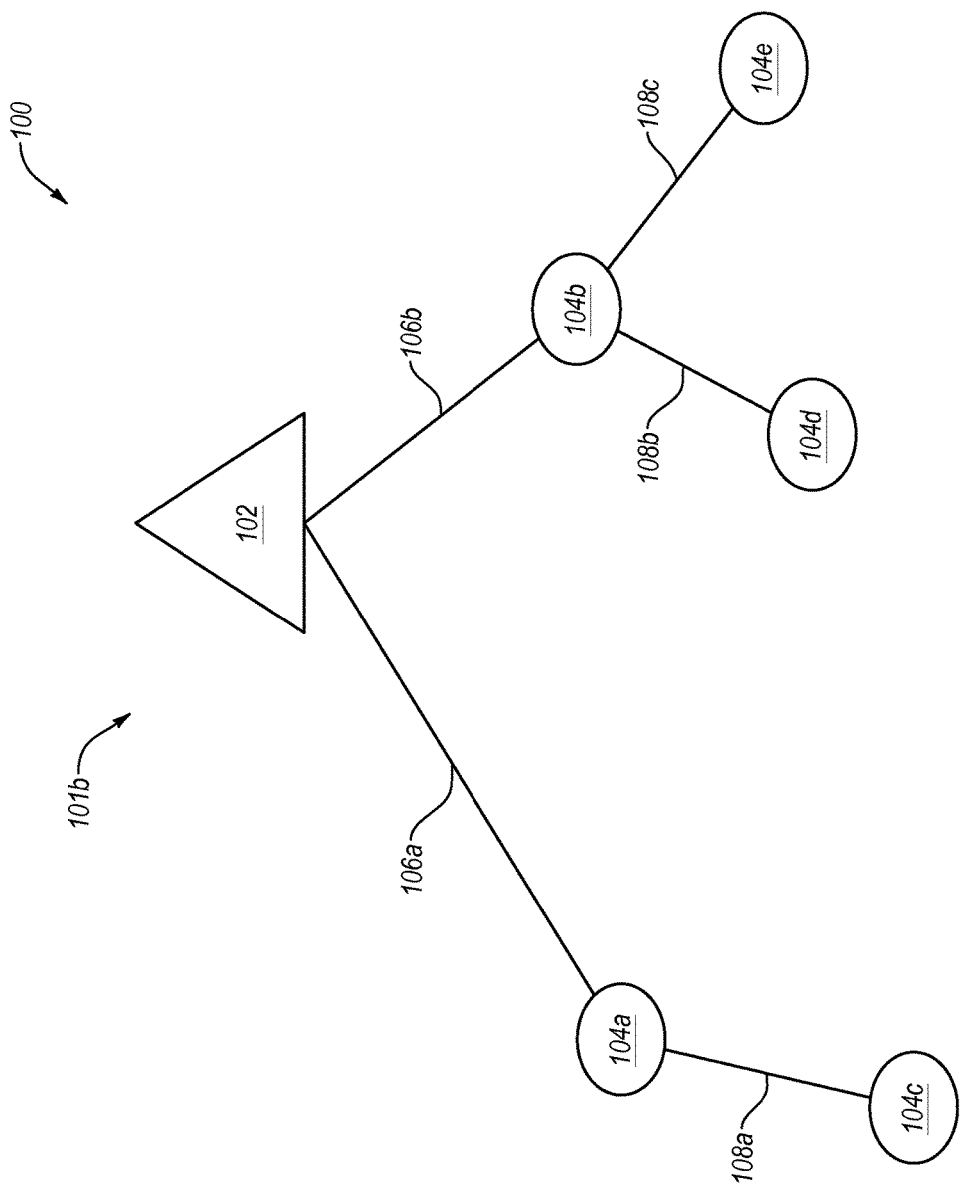
FIG. 1B illustrates a tethered configuration of the wireless communication network of FIG. 1A.

FIG. 1B illustrates a tethered configuration 101b of the network 100, according to at least one embodiment described herein. In the tethered configuration 101b of FIG. 1B, the wireless device 104c may be a slave device of the hotspot device 104a and the wireless devices 104d and 104e may be slave devices of the hotspot device 104b. The wireless devices 104c, 104d, and 104e may therefore also be referred to herein as slave devices 104c, 104d, and 104e when acting as such. Additionally, with respect to the tethered configuration 101b, the links 106a and 106b may be referred to as hotspot links 106a and 106b. Further, a wireless connection between the hotspot device 104a and the slave device 104c may be referred to as a slave link 108a; a wireless connection between the hotspot device 104b and the slave device 104d may be referred to as a slave link 108b; and a wireless connection between the hotspot device 104b and the slave device 104e may be referred to as a slave link 108c.

The communications over the hotspot link 106a may be communications intended for or derived from the hotspot device 104a and/or communications intended for or derived from the slave device 104c, which may be relayed by the hotspot device 104a. Similarly, the communications over the hotspot link 106b may be communications intended for or derived from the hotspot device 104a and/or communications intended for or derived from the slave device 104d or the slave device 104e, which may be relayed by the hotspot device 104b. In some embodiments, the hotspot devices 104a and 104b may be configured to aggregate a data packet received from one of their respective slave devices with another data packet that is originated by the respective hotspot device or received from another slave device in the same communication to the access point 102.

The access point 102 (acting as the wireless communications supervisor) may select a band and one or more channels that may be used for wireless communications over the hotspot links 106a and 106b. The band and channel(s) selected for wireless communications over the hotspot links 106a and 106b may be referred to hereinafter as the "hotspot band" and the "hotspot channel(s)." In some embodiments and wireless communications standards (e.g., in a WiFi application), wireless communications over the hotspot links 106a and 106b may use the same hotspot band and hotspot channel(s). For example, the hotspot band may be the 5 GHz WiFi band and the hotspot channels may be channels 36 and 40 of the 5 GHz WiFi band. In such a configuration, wireless communications over the hotspot links 106a and 106b may be performed over channels 36 and 40 of the 5 GHz WiFi band.

The access point 102 may also select a first slave band different from the hotspot band for communications between the hotspot device 104a and the slave device 104c. Similarly, the access point 102 may select a second slave band different from the hotspot band for communications between the hotspot device 104b and the slave devices 104d and 104e. For example, in a WiFi configuration when the 5 GHz WiFi band is selected as the hotspot band, one or more other WiFi bands (e.g., 2.4 GHz band, 60 GHz band, etc.) may be selected for the first slave band and the second slave band.

The first slave band and the second slave band may be the same band in some embodiments. When the first slave band and the second slave band are the same band, the access point 102 may select channels within the band that are substantially orthogonal to each other for communications between the hotspot devices 104a and 104b and their respective slave devices. For example, the 2.4 GHz WiFi band may be selected as both the first slave band and the second slave band. As such, channel 6 of the 2.4 GHz WiFi band may be selected for communications between the hotspot device 104a and the slave device 104c and channel 11 of the 2.4 GHz WiFi band may be selected for communications between the hotspot device 104b and the slave devices 104d and 104e.

In other embodiments, the first slave band and the second slave band may be different bands such that more of the available electromagnetic spectrum may be used for the wireless communications. For example, in some embodiments, the first slave band may be the 2.4 GHz WiFi band and the second slave band may be a television white space band that may be used by WiFi.

In some embodiments and wireless communications standards (e.g., in a WiFi application), wireless communications over all the slave links associated with a particular hotspot device may be performed using the same slave band and associated slave channel(s). For example, communications over the slave links 108b and 108c may use the same slave band and associated slave channel(s).

The access point 102 may select the hotspot band and hotspot channel(s) as well as the slave bands and associated slave channels based on any suitable criteria. For example, the channel selections may be based on which channels are the least congested. As another example, in some embodiments, the access point 102 may select the hotspot band based on it being a band that is compatible with both the hotspot devices 104a and 104b.

Additionally, in some instances, some of the wireless devices 104 may not have multi-band capability and may be more likely to be compatible with a certain band over another band. Therefore, in some embodiments, the access point 102 may select as the hotspot band, a band that may be compatible with both the hotspot devices 104a and 104b, but that may be less widely compatible such that a more compatible band or more compatible bands may be used for the slave bands. For example, in WiFi, the 2.4 GHz band may be more widely compatible than the 5 GHz band such that the 5 GHz band may be selected as the hotspot band to allow the 2.4 GHz band to be used as a slave band.

The number of hotspot channels may be selected by the access point 102 based on the amount of data (also referred to as "load") that may be transmitted over the hotspot links 106a and 106b such that a certain amount of bandwidth for communications over the hotspot links 106a and 106b may be allocated based on their respective loads. For example, when a relatively large amount of data is being communicated over the hotspot links 106a and 106b, multiple channels of the hotspot band may be selected to allocate more bandwidth for the communications over the hotspot links 106a and 106b.

In some embodiments, the access point 102 may be configured to initially allocate a certain band and one or more channels as the hotspot band and hotspot channel(s). The access point 102 may also be configured to dynamically change which band and channel(s) may be used as the hotspot band and hotspot channel(s) based on changes in the amount of data communicated over the links 106 and/or based on changes in one or more link indicators associated with one or more of the hotspot links 106.

Similarly, the number of slave channels selected for a particular hotspot device 104 may be based on the amount of data that may be transmitted over the slave links 108 associated with the particular hotspot device 104. As such, the number of slave channels may be selected to allocate bandwidth for communications over the corresponding slave links 108 based on the load of the corresponding slave links 108. For example, a relatively large amount of data may be communicated over the slave link 108a as compared to that communicated over the slave links 108b and 108c. In such instances, the access point 102 may allocate more channels (and consequently more bandwidth) for communication between the hotspot device 104a and the slave device 104c than for communication between the hotspot device 104a and the slave devices 104d and 104e.

In some embodiments, the access point 102 may be configured to initially allocate a certain band and one or more channels as the slave band and slave channel(s). In some embodiments, the access point 102 may be configured to dynamically change which bands and channels may be used as slave bands and slave channel(s) based on changes in the amount of data communicated over the slave links 108 and/or based on changes in one or more link indicators associated with one or more of the slave links 108. In some embodiments, the access point 102 may make the changes based on information (e.g., link indicators associated with the slave links 108, amount of data communicated over the slave links 108, etc.) provided by the hotspot devices 104a and 104b.

In some instances, the hotspot devices 104a and 104b may be relatively close to the access point 102 such that the power level of communications from the hotspot devices 104a and 104b to the access point 102 may be reduced while maintaining a desired throughput or data rate. As such, in some embodiments, the access point 102 (acting as the wireless communications supervisor) may also determine a power adjustment for uplink communications received at the access point 102 from the hotspot device 104a and/or the hotspot device 104b. In some embodiments, the power adjustment may be determined based on the minimum amount of transmission power needed for communication from each hotspot device to the access point 102 at a certain bandwidth to meet a minimum data rate requirement for each hotspot device.

For example, in some embodiments, the access point 102 may determine the minimum transmission power required for each hotspot device at each available bandwidth. The access point 102 may then add the minimum transmission powers for each hotspot device at each bandwidth and may select the bandwidth that corresponds to the lowest sum of the minimum transmission powers. The access point 102 may then instruct each hotspot device to transmit uplink signals at the lowest allowed power value for each respective hotspot device at the selected bandwidth.

Similarly, in some embodiments, the power level of communications between the hotspot devices 104a and 104b and their respective slave devices may also be reduced while maintaining a desired throughput or data rate. In some embodiments, the power control for communications between the hotspot devices 104a and 104b and their respective slave devices may be determined by selecting the minimum power needed with respect to the allocated bandwidth that also meets the data rate requirements of the slave devices.

In some embodiments, the access point 102 may not have enough information about the slave links 108 to perform the power adjustment determination such that the hotspot device 104a and/or the hotspot device 104b may perform the power adjustment determination. In other embodiments, the needed information may be communicated to the access point 102 such that the access point may make the determination. Additionally, in these or other embodiments, power adjustment may be applied only the hotspot devices for communications to their respective slave devices but not by their respective slave devices. In other embodiments, the power adjustment may be communicated to the slave devices such that they may apply the power adjustment with respect to communications to their respective hotspot devices.

In some embodiments, the power adjustment described above may be performed based on an amount of congestion of the hotspot and/or slave channels. For example, the power adjustment may be performed for communications over certain channels when the access point 102 and/or the hotspot devices 104a and 104b do not detect that the certain channels are being used by another wireless network that may be nearby. However, when the certain channels are detected as being used by another nearby wireless network, in some embodiments, the power adjustment may not be performed because the communications from the nearby wireless network performed over the certain channels may substantially interfere with the communications in the network 100 performed over the certain channels if the power of the communications over the certain channels is reduced.

For example, the hotspot channel may be channel 36 of the 5 GHz WiFi band and the access point 102 may detect that another wireless network is also using channel 36 of the 5 GHz WiFi band. The access point 102 may accordingly not determine the power adjustment and may not instruct the hotspot devices 104a and 104b to adjust the power of uplink communications to the access point 102 over channel 36 of the 5 GHz WiFi band. In contrast, when the access point 102 does not detect that channel 36 of the 5 GHz WiFi band is being used by another wireless network, the access point 102 may perform and communicate the power adjustment such that the power adjustments may be performed with respect to uplink communications over channel 36 of the 5 GHz WiFi band. The hotspot devices 104a and 104b may similarly decide whether or not to perform power adjustments with respect to communications with their respective slave devices based on whether or not their respective slave channel(s) are detected as being used by another wireless network.

In some embodiments, the access point 102 (acting as a wireless communications supervisor) may indicate to the hotspot devices 104a and 104b whether or not power adjustment may be performed over one or more hotspot channels by setting or unsetting a hotspot power control flag that may be communicated to the hotspot devices 104a and 104b. In these or other embodiments, the access point 102 (acting as a wireless communications supervisor) may indicate to the hotspot devices 104a and 104b whether or not power adjustment may be performed over one or more of their respective slave channels by setting or unsetting a slave power control flag that may be communicated to the hotspot devices 104a and 104b.

Sometimes one or more of the wireless devices 104 may move such that the tethered configuration 101b may change. For example, in some instances a particular wireless device 104 acting as a slave device may move such that it may have a better connection with a different hotspot device or with the access point 102 than with its current hotspot device. As such, a handoff may be performed in which the particular wireless device may receive wireless communication services via a different hotspot device as a new slave device of the different hotspot device or directly via the access point 102 as a new hotspot device or just as a regular wireless device. In some embodiments, the access point 102 may reallocate bandwidth according to the changes in the tethered configuration.

Figure 1C:
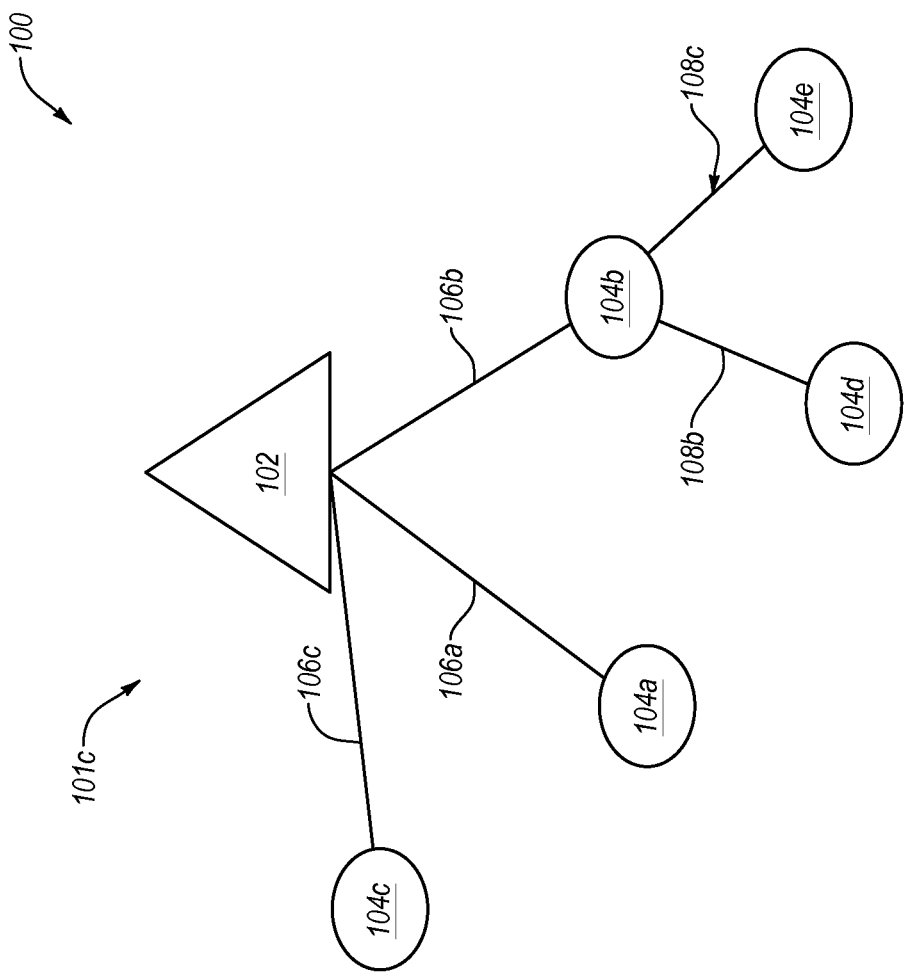
FIG. 1C illustrates a modified-tethered configuration of the wireless communication network of FIG. 1A.

By way of example, FIG. 1C illustrates a modified-tethered configuration 101c in which the wireless device 104c has moved as compared to the tethered configuration 101b, according to at least one embodiment described herein. In the illustrated embodiment, the wireless device 104c may have moved away from the wireless device 104a and toward the access point 102 such that it may have a better wireless connection with the access point 102 via the link 106c than the previous wireless connection with the wireless device 104a via the link 108a (illustrated in FIG. 1B but not FIG. 1C). Therefore, a handoff may have been performed between the wireless device 104a and the access point 102. As a result, the wireless device 104 may receive wireless communication services directly from the access point 102 via the link 106c instead of being a slave device serviced by the wireless device 104a.

Additionally, in some embodiments, the access point 102 (acting as a wireless communications supervisor) may change the hotspot band, hotspot channel, slave band, and/or slave channel allocations based on changes in loads due to the handoff of the wireless device 104c. For example, the wireless device 104a and the wireless device 104b may have been allocated the 2.4 GHz WiFi band as their respective slave bands, with channel 6 being allocated to the wireless device 104a and channel 11 being allocated to the wireless device 104b in the tethered configuration 101b of FIG. 1B.

However, in the modified-tethered configuration 101c of FIG. 1C, the wireless device 104a may no longer be acting as a hotspot device such that there may no longer be any loads over channel 6 of the 2.4 GHz WiFi band. Therefore, channel 6 of the 2.4 GHz WiFi band may be allocated as an additional slave channel for the wireless device 104b (e.g., when increased bandwidth over the slave links 108b and 108c is desired). Additionally, in these and other instances, the access point 102 may allocate another channel of the hotspot band as a hotspot channel in the post-tethering configuration 101c because of increased traffic over the hotspot band and hotspot channel(s) due to the additional communications between the access point 102 and the wireless device 104c.

As another example of movement by a wireless device 104, in some instances a particular wireless device 104 acting as a hotspot device may move such that the strength of its link with the access point 102 may be outside of what may be accepted for a hotspot device. As such, the access point 102 may determine that the particular wireless device 104 may not be a hotspot device any more. In some instances, the particular wireless device 104 may then associate with a hotspot device that may be relatively close to the particular wireless device 104 such that the particular wireless device may be a slave of the hotspot device. Additionally, any of the previous slave devices of the particular wireless device 104 may also associate with another hotspot device. In some embodiments, the access point 102 (acting as a wireless communications supervisor) may reallocate channels and associated bandwidth according to the changes in the post-tethering configuration.

Figure 1D:
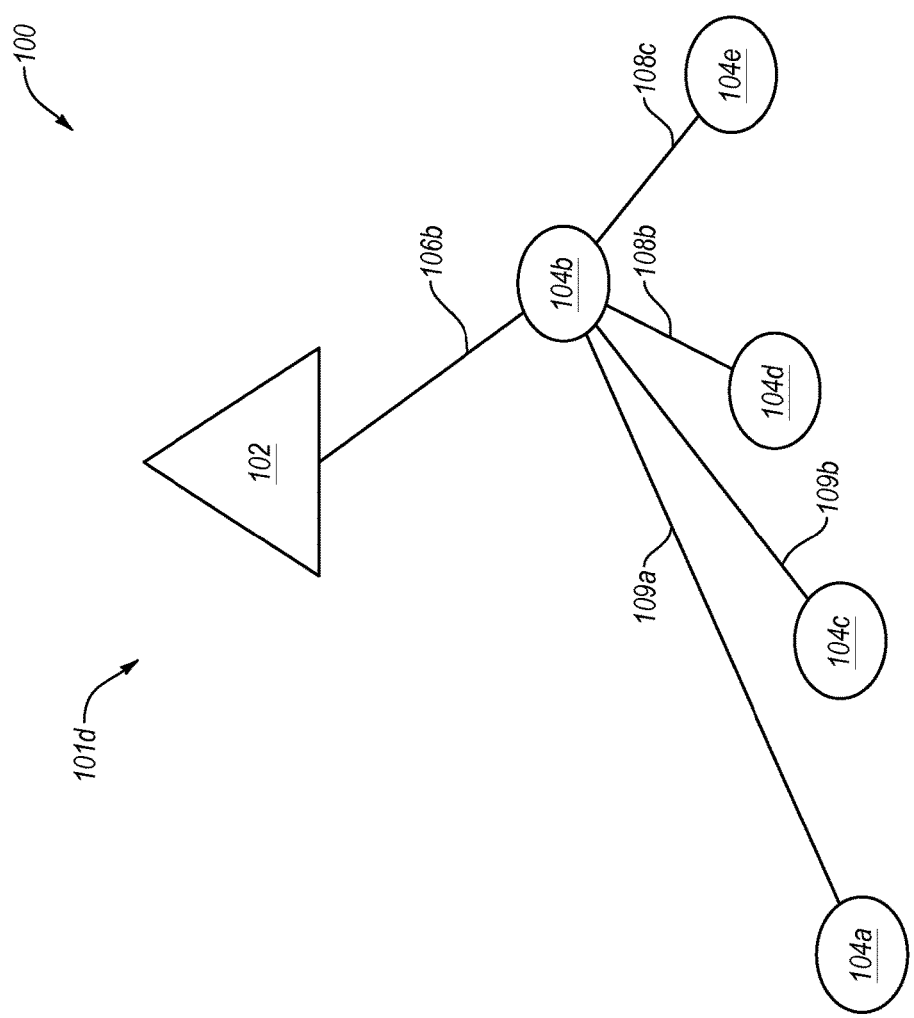
FIG. 1D illustrates another modified-tethered configuration of the wireless communication network of FIG. 1A.

By way of example, FIG. 1D illustrates a modified-tethered configuration 101d in which the wireless device 104c has moved with respect to its location in the tethered configuration 101b of FIG. 1B, according to at least one embodiment described herein. In the illustrated embodiment, the wireless device 104a may have moved away from the access point 102 such that the hotspot link 106a (illustrated in FIG. 1B but not in FIG. 1D) may not satisfy the requirements for the wireless device 104a to act as a hotspot device. Accordingly, the access point 102 may remove the hotspot device assignment from the wireless device 104a. The wireless device 104a may then wirelessly connect via a slave link 109a with the hotspot device 104b as a slave device of the hotspot device 104b. Additionally, the wireless device 104c, which was a slave device of the wireless device 104a in the tethered configuration 101b of FIG. 1B, may also wirelessly connect via a slave link 109b with the hotspot device 104b as a slave device of the hotspot device 104b.

Additionally, in some embodiments, the access point 102 (acting as a wireless communications supervisor) may change the hotspot band, hotspot channel, slave band, and/or slave channel allocations based on changes in data loads due to movement of the wireless device 104a. For example, the access point 102 may allocate another channel of the slave band associated with the hotspot device 104b because of increased traffic over the slave band and slave channel(s) due to the addition of the wireless devices 104a and 104c as slave devices of the hotspot device 104b. Further, in some embodiments, the access point 102 (acting as a wireless communications supervisor) may avoid assigning as hotspot devices those wireless devices 104 that move around with a relatively high frequency so as to avoid or reduce situations similar to the situation associated with changing the tethered configuration 101b of FIG. 1B to the modified-tethered configuration 101d of FIG. 1D.

Figure 1E:
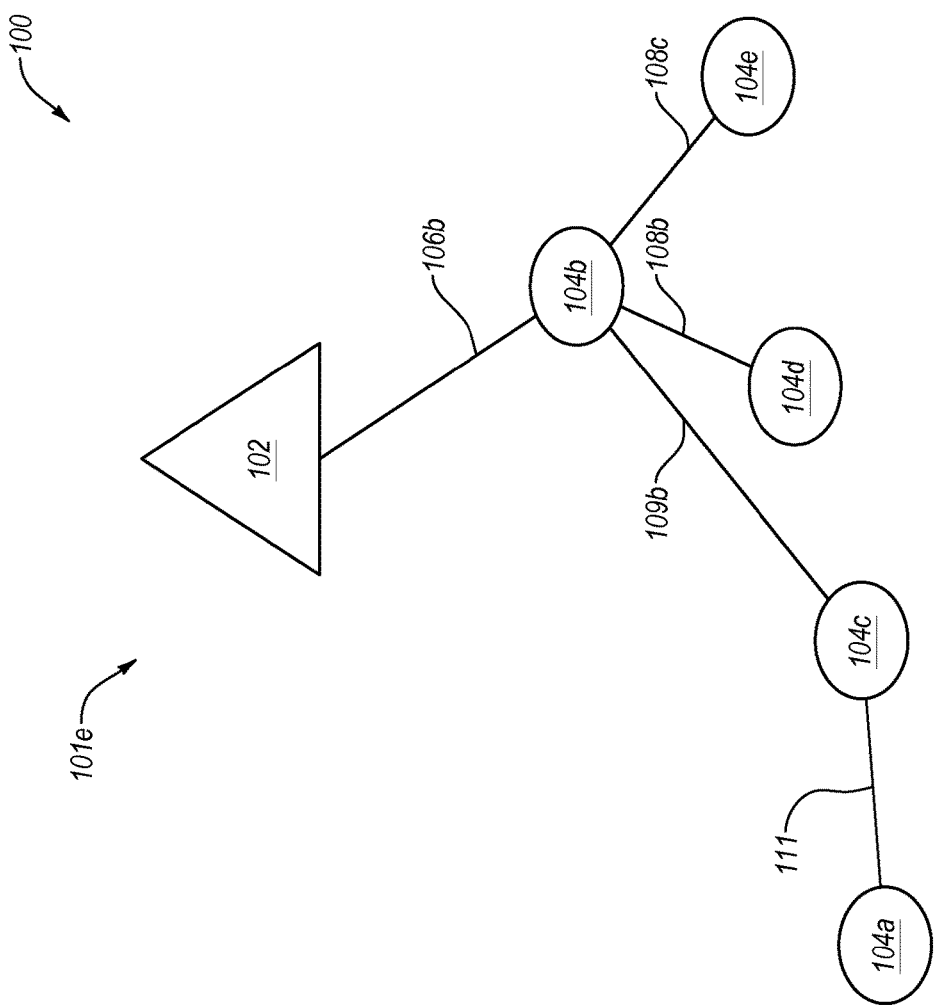
FIG. 1E illustrates a multi-hop tethering configuration of the wireless communication network of FIG. 1A.

In some embodiments, a slave device may also act as a hotspot device for another wireless device in a multi-hop tethering configuration. For example, FIG. 1E illustrates a multi-hop tethering configuration 101e, according to at least one embodiment described herein. In the multi-hop tethering configuration 101e, the wireless device 104c may be wirelessly connected to the wireless device 104b via a slave link 109b such that the wireless device 104c may be a slave device of the hotspot device 104b. Additionally, the wireless device 104a may be wirelessly connected to the wireless device 104c via a slave link 111 such that the wireless device 104a may be a slave device of the wireless device 104c. Accordingly, the wireless device 104c may act as both a slave device and a hotspot device.

In the multi-hop tethering configuration 101e, the wireless device 104b may perform one or more operations as a wireless communications supervisor. For example, the wireless device 104b may be configured to select hotspot devices from its respective slave devices in a manner similar to that described above with respect to the access point 102 selecting hotspot devices. Additionally, in some embodiments, the wireless device 104b, acting as a wireless communications supervisor, may select a sub-level hotspot band and one or more sub-level hotspot channels for communications between the wireless device 104b and the wireless device 104c as well as a sub-level slave band and one or more sub-level slave channels for communications between the wireless device 104c and the wireless device 104a. In other embodiments, the access point 102 may act as the wireless communications supervisor that selects the sub-level hotspot band, sub-level hotspot channel(s), sub-level slave band, and sub-level slave channel(s).

In multi-hop configurations, the bands selected for communications between adjacent levels may be different, but the bands selected for communications between non-adjacent levels may be the same or different. For example, in the multi-hop tethering configuration 101e, communications between the access point 102 and the wireless device 104b may be considered a first level; communications between the wireless device 104b and the wireless devices 104c, 104d, and 104e may be considered a second level; and communications between the wireless device 104c and the wireless device 104a may be considered a third level. Accordingly, the bands used for the first level and the second level may be different from each other and the bands used for the second level and the third level may be different from each other. However, the bands used for the first level and the third level may be the same or different. When the bands used for the first level and the third level are the same, different channels may be selected for the first level and the third level to avoid or reduce interference. In these or other embodiments, the same channels may also be used for the first and third levels in conjunction with power control to avoid or reduce interference.

Accordingly, the network 100 of FIGS. 1A-1E may be configured to have any number of tethering configurations that may reduce or eliminate the rate-anomaly problem that may be associated with some wireless networks. Modifications, additions, or omissions may be made to FIGS. 1A-1E without departing from the scope of the present disclosure. For example, the specific tethering configurations illustrated are merely examples of any number of tethering configurations. Additionally, the number of wireless devices illustrated is merely for illustrative purposes and is not limiting.

Figure 2:
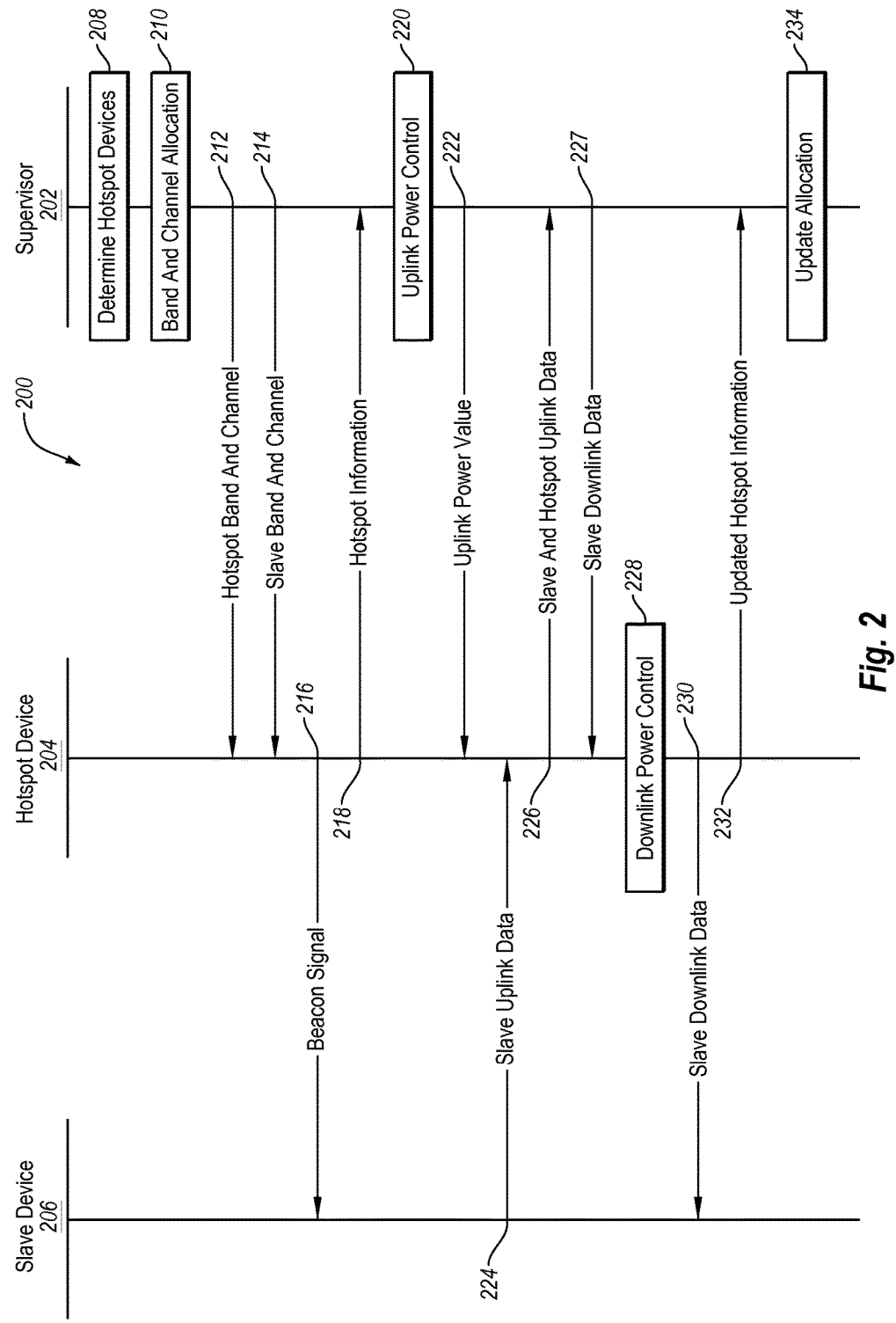
FIG. 2 illustrates an example signaling mechanism for tethering wireless devices.

FIG. 2 illustrates an example signaling mechanism 200 for tethering wireless devices, according to at least one embodiment described herein. One or more operations of the signaling mechanism 200 may be performed by a wireless communications supervisor 202 (referred to hereinafter as the "supervisor 202"), a hotspot device 204, and/or a slave device 206. In some embodiments, an access point of a wireless network, such as the access point 102 of FIGS. 1A-1E may be the supervisor 202. In these or other embodiments, a particular wireless device of a multi-hop tethering configuration may be the supervisor 202 where a slave device of the particular wireless device may also be a hotspot device to one or more sub-level slave devices. For example, the wireless device 104b of the multi-hop tethering configuration 101e of FIG. 1E may be the supervisor 202. Any suitable wireless device such as the wireless devices 104a-104e of FIGS. 1A-1E may be the hotspot device 204 or the slave device 206.

In the signaling mechanism 200, the supervisor 202 may determine which wireless devices that are wirelessly connected to the supervisor 202 may be hotspot devices at step 208. In some embodiments, the supervisor 202 may determine the hotspot devices according to link indicators and a link indicator threshold as described above.

At step 210, the supervisor 202 may determine, as an initial allocation, a band and one or more associated channels that may be used as a hotspot band and hotspot channel(s) for communications between the supervisor 202 and the one or more hotspot devices. Additionally, at step 210, the supervisor 202 may determine, as an initial allocation, one or more bands and one or more associated channels that may be used as slave band(s) and slave channel(s) for communications between the hotspot devices and their associated slave devices.

At step 212, the supervisor 202 may communicate to the hotspot device 204 information indicating the hotspot band and hotspot channel(s). After receiving the hotspot band and hotspot channel(s), the hotspot device 204 may configure one of its radios to operate in the indicated hotspot band and hotspot channel(s). In some embodiments, a hotspot flag indicating whether or not power control over one or more of the hotspot channels may also be communicated at step 212, which may be based on the congestion of the hotspot channel(s).

At step 214, the supervisor 202 may communicate to the hotspot device 204, information indicating the slave band and slave channel(s) allocated to the hotspot device 204. After receiving the slave band and slave channel(s), the hotspot device 204 may configure another one of its radios to operate in the indicated slave band and slave channel(s). In some embodiments, a slave flag indicating whether or not power control over one or more of the slave channels may also be communicated at step 214, which may be based on the congestion of the slave channel(s).

At step 216, the hotspot device 204 may transmit a beacon signal (e.g., SSID signal) in the indicated slave band and slave channel(s). The beacon signal may be received by one or more slave devices, such as the slave device 206, at step 216. One or more of the slave devices that receives the beacon signal, including the slave device 206, may associate with the hotspot device 204 based on the received beacon signal. For example, when the signal strength, as received by the slave device 206 of the beacon signal transmitted by the hotspot device 204 is higher than the signal strength of beacon signals transmitted by the supervisor 202 or another hotspot device, the slave device 206 may associate with the hotspot device 204 as a slave device of the hotspot device 204.

At step 218, the hotspot device 204 may communicate, over the hotspot band and hotspot channel(s), hotspot information to the supervisor 202. The hotspot information may indicate a list of wireless devices that have connected with the hotspot device 204 as slave devices (e.g., a list that includes the slave device 206), one or more link indicators (e.g., SNR, gain, etc.) of the link between the hotspot device 204 and the supervisor 202, one or more link indicators (e.g., SNR, gain, etc.) of the links between the hotspot device 204 and its associated slave devices, and/or the load (e.g., amount of data communicated between the hotspot device 204 and its associated slave devices) associated with the hotspot device 204 acting as a hotspot device.

In some embodiments, at step 220, the supervisor 202 may determine power control for uplink signals that may be transmitted to the supervisor 202 from the hotspot device 204. The power control may be based on information included in the hotspot information transmitted at step 218, such as the one or more link indicators. In some embodiments, the supervisor 202 may determine the power control based on the power adjustment described above. At step 222, the supervisor 202 may communicate, over the hotspot band and hotspot channel(s), to the hotspot device 204 a power value for subsequent uplink communications from the hotspot device 204 to the supervisor 202. In these or other embodiments, when the supervisor 202 detects that another wireless network may be using the hotspot channel(s), the supervisor 202 may not perform steps 220 and 222 associated with the power control for uplink signals and the corresponding communication to the hotspot device 204. In some embodiments, the supervisor 202 may or may not perform step 220 based on whether the hotspot flag is set.

At step 224, the slave device 206 may transmit and the hotspot device 204 may receive, over the slave band and slave channel(s) associated with the hotspot device 204, slave uplink data intended for the supervisor 202. In some embodiments, the slave device 206 may also include with the slave uplink data one or more link indicators (e.g., SNR, gain, etc.) of the link between the hotspot device 204 and the slave device 206. At step 226, the hotspot device 204 may aggregate the slave uplink data with its own hotspot uplink data and may communicate, over the hotspot band and hotspot channel(s), both the slave uplink data and the hotspot uplink data to the supervisor 202. When the hotspot device 204 receives an uplink power value, such as at step 222, the hotspot device 204 may communicate the slave uplink data and the hotspot uplink data according to the received uplink power value. Otherwise, the hotspot device 204 may communicate the slave uplink data and the hotspot uplink data according to a default power value (e.g., a maximum allowed power).

At step 227, the supervisor 202 may communicate to the hotspot device 204, over the hotspot band and hotspot channel(s), slave downlink data intended for the slave device 206. In some embodiments, the hotspot device 204 may determine, at a step 228, power control for downlink signals that may be transmitted to the slave device 206 from the hotspot device 204. The power control may be based on information communicated to the hotspot device 204 at step 224, such as one or more link indicators associated with the link between the hotspot device 204 and the slave device 206. In some embodiments, the hotspot device 204 may determine the power control based on the power adjustment described above. In these or other embodiments, when the hotspot device 204 (or the supervisor 202) detects that another wireless network may be using the slave channel(s), the hotspot device 204 may not perform step 228 associated with the power control for downlink signals to the slave device 206. In some embodiments, the hotspot device 204 may or may not perform step 228 based on whether the slave flag is set.

At step 230, the hotspot device 204 may communicate to the slave device 206, over the slave band and slave channel(s), the slave downlink data received from the supervisor 202 at step 227. When power control is determined, such as at step 228, the hotspot device 204 may communicate the slave downlink data according to the determined power level. Otherwise, the hotspot device 204 may communicate the slave downlink data based on a default power setting.

At step 232, the hotspot device 204 may communicate updated hotspot information to the supervisor 202. The updated hotspot information may indicate an updated list of wireless devices that have connected with the hotspot device 204 as slave devices, an update of one or more link indicators (e.g., SNR, gain, etc.) of the link between the hotspot device 204 and the supervisor 202, an update of one or more link indicators of the link between the hotspot device 204 and the slave device 206, and/or an update of the load associated with the hotspot device 204.

At step 234, the supervisor 202 may update channel and/or band allocation based on the received updated hotspot information. For example, the supervisor 202 may increase or reduce the number of slave channels allocated for use by the hotspot device 204 for communications with its respective slave devices based on the load information.

Accordingly, the signaling mechanism 200 may be used with respect to tethering wireless devices as described herein. Modifications, additions, or omissions may be made to the signaling mechanism 200 without departing from the scope of the present disclosure. For example, one skilled in the art will appreciate that the operations described with respect to the signaling mechanism 200 may be implemented in differing order. For example, the allocation updating performed at step 234 may also be performed by the supervisor 202 after receiving the hotspot information at step 218. As another example, the uplink power control determination may be performed by the hotspot device 204 in some instances. Additionally, in some embodiments, the downlink power control determination may be communicated to the slave device 206 such that the slave device 206 may adjust the power of its uplink communications to the hotspot device based on the downlink power control determination.

Furthermore, the outlined steps and operations are only provided as examples, and some of the steps and operations may be optional, combined into fewer steps and operations, or expanded into additional steps and operations without detracting from the essence of the disclosed embodiments. Additionally, one or more steps may be performed at the same time, or may include one or more other operations.

Figure 3:
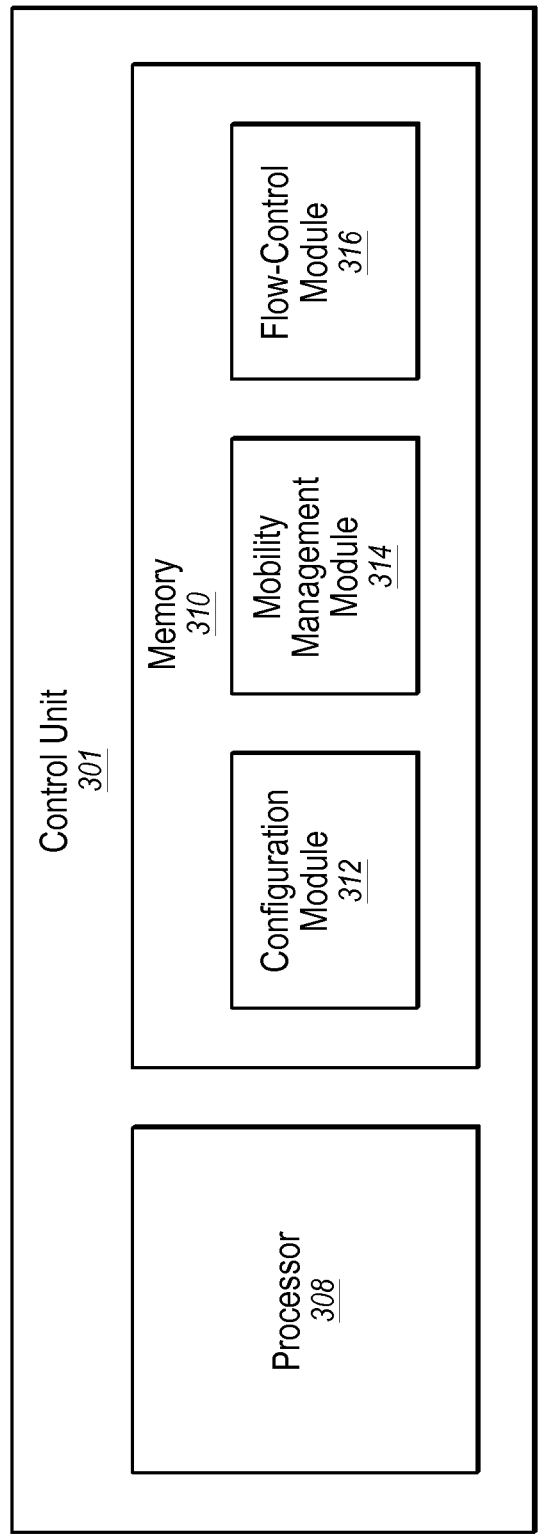
FIG. 3 illustrates an example control unit associated with tethering wireless devices.

FIG. 3 illustrates an example control unit 301 associated with tethering wireless devices, arranged in accordance with at least one embodiment of the present disclosure. For example, in some embodiments, the control unit 301 may be included in the access point 102 and/or any of the wireless devices 104 of FIGS. 1A-1E. Additionally, the control unit 301 may enable operations associated with a device acting as a hotspot device, a slave device, and/or a wireless communications supervisor as described herein.

The control unit 301 may include a processor 308 and memory 310. The processor 308 may be any suitable special-purpose or general-purpose computer, computing entity, or processing device including various computer hardware or software modules. For example, the processor 308 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 308 may include any number of processors configured to perform any number of operations.

The memory 310 may include computer-readable media for carrying or having computer-executable instructions or data structures stored thereon. Such computer-readable media may be any available media that may be accessed by a general-purpose or special-purpose computer. By way of example, and not limitation, such computer-readable media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media. Computer-executable instructions may include, for example, instructions and data which cause the processor 308 to perform a certain function or operation associated with tethering wireless devices or group of functions or operations associated with tethering wireless devices.

In the illustrated embodiment, the memory 310 may include a configuration module 312, a mobility management module 314 and a flow-control module 316. The configuration module 312, the mobility management module 314, and the flow-control module 316 may include instructions for operations associated with a wireless communications supervisor. For example, the flow-control module 316 may include instructions associated with operations corresponding to selecting which wireless devices may act as hotspot devices. The configuration module 312 may include instructions associated with operations corresponding to band and channel selection and allocation. The mobility management module 314 may include instructions associated with operations corresponding to movements of wireless devices. It is understood that the specific modules indicated are merely examples and any suitable configuration of instructions may be used.

Furthermore, as used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modules running on a computing system.

Figure 4:
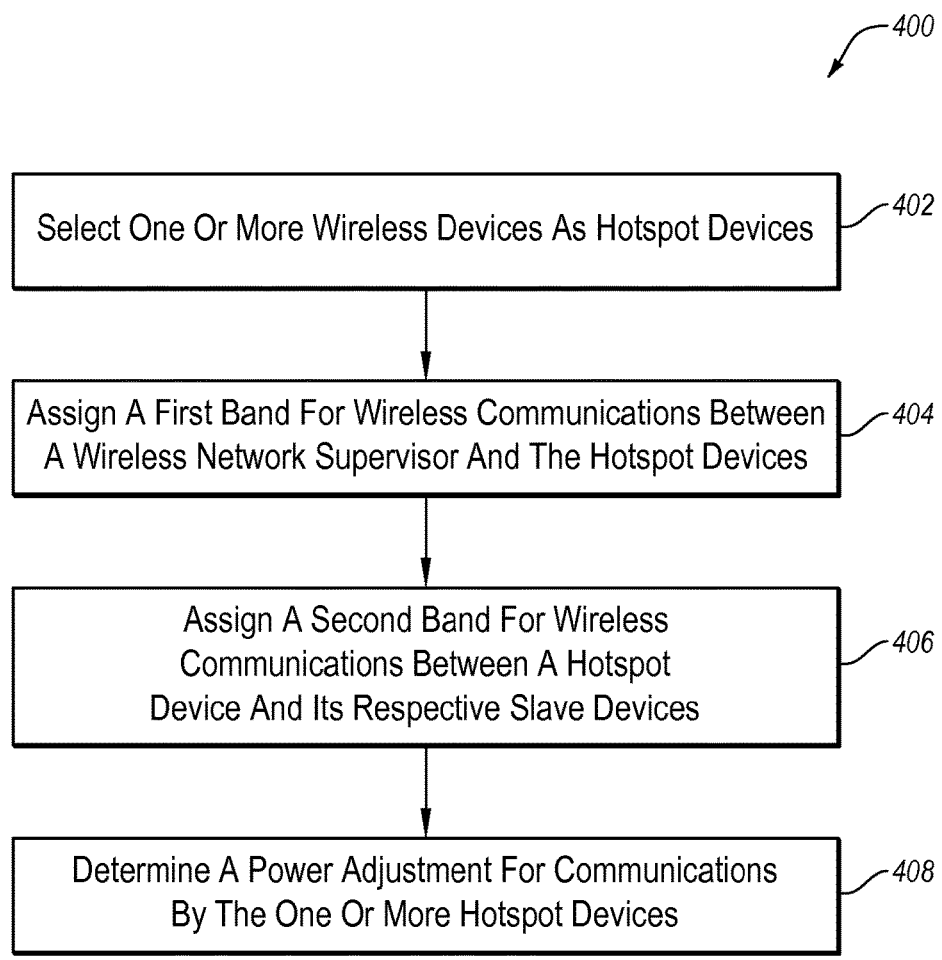
FIG. 4 is a flowchart of an example method of scheduling wireless communications associated with wireless device tethering.

FIG. 4 is a flowchart of an example method 400 of scheduling wireless communications associated with wireless device tethering, arranged in accordance with at least one embodiment of the present disclosure. The method 400 may be implemented, in some embodiments, by one or more control units included in one or more wireless devices and/or access points, such as the control unit 301 of FIG. 3. Although illustrated as discrete blocks, various blocks of the method 400 may be divided into additional blocks, combined into fewer blocks, or eliminated, depending on the desired implementation.

The method 400 may begin at block 402, where one or more wireless devices may be selected as hotspot devices that are configured to relay information between one or more slave wireless devices and a wireless communications supervisor. In some embodiments, the one or more hotspot devices may be selected based on a link indicator threshold and link indicators of links between the hotspot devices and the wireless communications supervisor as described above.

At block 404, a first band of a wireless communications standard may be assigned for wireless communications between the wireless communications supervisor and the hotspot devices. Additionally, one or more channels of the first band may be assigned for the wireless communications between the wireless communications supervisor and the hotspot devices. In some embodiments, the wireless communications standard may be the WiFi standard and the first band and associated channels may be one of the WiFi bands and channels.

At block 406, a second band of the wireless communications standard may be assigned for wireless communications between the hotspot devices and one or more slave devices. Additionally, one or more channels of the second band may be assigned for the wireless communications between the hotspot devices and the slave devices. In some embodiments, when there is more than one hotspot device, the second band may be assigned for wireless communications between a hotspot device and its associated slave devices and a third band may be assigned for wireless communications between another hotspot device and its associated slave devices. In these or other embodiments, the second band may be assigned for communications between two or more hotspot devices and their associated slave devices, but different channels that are substantially orthogonal to each other of the second band may be assigned between the different hotspot devices.

At block 408, a power adjustment for communications by the one or more hotspot devices may be determined. In some embodiments, the power adjustment may be determined based on congestion of the channels associated with the first band and/or the second band. In some embodiments, a power level of communications between the wireless communications supervisor and the hotspot devices may be adjusted. In these and other embodiments, the power adjustment may be performed when it is not detected that another wireless communications network is using the same band and channel as the communications between the wireless communications supervisor and the hotspot devices. Similarly, in some embodiments a power level of communications between the hotspot devices and their associated slave devices may be adjusted. In these and other embodiments, the power adjustment may be performed when it is not detected that another wireless communications network is using the same band and channel as the communications between the hotspot devices and their associated slave devices.

Accordingly, the method 400 may be used to schedule wireless communications associated with tethering wireless devices. One skilled in the art will appreciate that the functions performed in method 400 may be implemented in differing order. Furthermore, the outlined steps and operations are only provided as examples, and some of the steps and operations may be optional, combined into fewer steps and operations, or expanded into additional steps and operations without detracting from the essence of the disclosed embodiment.

Further, the method 400 may include steps associated with dynamically allocating bandwidth (e.g., by dynamically allocating channels) to the hotspot devices based on the respective loads of the hotspot devices (e.g., the amount of data relayed between the hotspot devices and their respective slave devices). Additionally, the method 400 may include steps associated with reconfiguring which wireless devices may act as hotspot devices based on a change in one or more links between the wireless communications supervisor and the wireless devices. For example, wireless device acting as a hotspot device may move too far away from the wireless communications supervisor to be a hotspot device anymore and may accordingly be undesignated as a hotspot device. Conversely, a wireless device that was not acting as a hotspot device may move close enough to the wireless network supervisor such that it may be a hotspot device and may accordingly be designated as a hotspot device.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of scheduling wireless communications, the method comprising:

determining a first link indicator associated with a first link between a first wireless device and a wireless communications supervisor of a wireless network;

determining a second link indicator associated with a second link between a second wireless device and the wireless communications supervisor;

comparing the first link indicator with the second link indicator to determine a difference between the first link indicator and the second link indicator;

determining that the difference between the first link indicator and the second link indicator is within a link indicator threshold that is based on data rates associated with wireless communication links;

in response to determining that the difference between the first link indicator and the second link indicator is within the link indicator threshold:

configuring the first wireless device to operate as a first hotspot device, the first hotspot device being configured to operate as the first hotspot device by being configured to relay information between one or more first slave wireless devices and the wireless communications supervisor; and configuring the second wireless device to operate as a second hotspot device, the second hotspot device being configured to operate as the second hotspot device by being configured to relay information between one or more second slave wireless devices and the wireless communications supervisor;

assigning a first band of a wireless communications standard for wireless communications between the wireless communications supervisor and the first and second hotspot devices based on the first and second hotspot devices operating as hotspot devices;

assigning a second band of the wireless communications standard for wireless communications between the first hotspot device and the one or more first slave wireless devices; and determining a power adjustment for communications by the first and second hotspot devices based on a congestion of one or more channels within one or more of the first band and the second band.

2. The method of claim 1, wherein the wireless communications standard is the IEEE 802.11 wireless communications standard.

3. The method of claim 1, wherein the method further comprises:

assigning a first channel of the second band for wireless communications between the first hotspot device and the one or more first slave wireless devices; and assigning a second channel of the second band for wireless communications between the second hotspot device and the one or more second slave wireless devices, the second channel being substantially orthogonal to the first channel.

4. The method of claim 1, wherein the method further comprises:

assigning a third band of the wireless communications standard for wireless communications between the second hotspot device and the one or more second slave wireless devices.

5. The method of claim 1, wherein the first band or the second band includes the 2.4 gigahertz (GHz) band of the IEEE 802.11 wireless communications standard, the 5 GHz band of the IEEE 802.11 wireless communications standard, the 60 GHz band of the IEEE 802.11 wireless communications standard, or a white-space band that complies with the IEEE 802.11 wireless communications standard.

6. The method of claim 1, further comprising dynamically allocating bandwidth to the first and second hotspot devices based on the respective loads of the first and second hotspot devices.

7. The method of claim 1, wherein the wireless communications network is a first wireless communications network and the method further comprises:

assigning a channel of the first band for wireless communications between the wireless communications supervisor and the first and second hotspot devices; and wherein determining the power adjustment for communications by the first and second hotspot devices includes:

detecting whether the channel is being used by a second wireless communications network different from the first wireless communications network; and adjusting a power level of uplink communications over the channel from the first and second hotspot devices to the wireless communications supervisor in response to the detecting indicating that the channel is not being used by the second wireless communications network.

8. The method of claim 1, wherein:

the first link indicator includes one or more of a first signal-to-noise ratio (SNR) over the first link and a received power at the wireless communications supervisor of a first signal transmitted from the first hotspot device to the wireless communications supervisor over the first link; and the second link indicator includes one or more of a second SNR over the second link and a received power at the wireless communications supervisor of a second signal transmitted from the second hotspot device to the wireless communications supervisor over the second link.

9. The method of claim 1, wherein the link indicator threshold is based on the first link indicator and the second link indicator mapping to no more than two modulation and coding scheme levels.

10. The method of claim 1, further comprising reconfiguring which wireless devices operate as hotspot devices based on a change in one or more links between the wireless communications supervisor and the wireless devices.

11. A non-transitory computer-readable storage medium configured to store instructions that, when executed by one or more processors, cause a device to perform operations for scheduling wireless communications, the operations comprising:

determining a first link indicator associated with a first link between a first wireless device and a wireless communications supervisor of a wireless network;

determining a second link indicator associated with a second link between a second wireless device and the wireless communications supervisor;

comparing the first link indicator with the second link indicator to determine a difference between the first link indicator and the second link indicator;

determining that the difference between the first link indicator and the second link indicator is within a link indicator threshold that is based on data rates associated with wireless communication links;

in response to determining that the difference between the first link indicator and the second link indicator is within the link indicator threshold:

configuring the first wireless device to operate as a first hotspot device, the first hotspot device being configured to operate as the first hotspot device by being configured to relay information between one or more first slave wireless devices and the wireless communications supervisor; and configuring the second wireless device to operate as a second hotspot device, the second hotspot device being configured to operate as the second hotspot device by being configured to relay information between one or more second slave wireless devices and the wireless communications supervisor;

assigning a first band of a wireless communications standard for wireless communications between the wireless communications supervisor and the first and second hotspot devices based on the first and second hotspot devices operating as hotspot devices;

assigning a second band of the wireless communications standard for wireless communications between the first hotspot device and the one or more first slave wireless devices; and determining a power adjustment for communications by the first and second hotspot devices based on a congestion of one or more channels within one or more of the first band and the second band.

12. The computer-readable storage medium of claim 11, wherein the operations further comprise:
  assigning a first channel of the second band for wireless communications between the first hotspot device and the one or more first slave wireless devices; and
  assigning a second channel of the second band for wireless communications between the second hotspot device and the one or more second slave wireless devices, the second channel being substantially orthogonal to the first channel.

13. The computer-readable storage medium of claim 11, wherein the operations further comprise:
  assigning a third band of the wireless communications standard for wireless communications between the second hotspot device and the one or more second slave wireless devices.

14. The computer-readable storage medium of claim 11, wherein the link indicator threshold is based on modulation and coding scheme levels such that the first link indicator and the second link indicator map to no more than two modulation and coding scheme levels.

\* \* \* \* \*